US012033106B2

(12) United States Patent
Klingemann

(10) Patent No.: US 12,033,106 B2
(45) Date of Patent: Jul. 9, 2024

(54) METHOD AND SYSTEM FOR DISTRIBUTING THE COSTS AMONG PLATOONING VEHICLES BASED ON COLLECTED SENSOR DATA

(71) Applicant: 2TIL International UG, Hofheim am Taunus (DE)

(72) Inventor: Jörn Klingemann, Hofheim am Taunus (DE)

(73) Assignee: 2TIL International UG, Hofheim am Taunus (DE)

( * ) Notice: Subject to any disclaimer, the term of this patent is extended or adjusted under 35 U.S.C. 154(b) by 704 days.

(21) Appl. No.: 17/250,324

(22) PCT Filed: Jul. 4, 2019

(86) PCT No.: PCT/EP2019/068008
§ 371 (c)(1),
(2) Date: Jan. 5, 2021

(87) PCT Pub. No.: WO2020/007987
PCT Pub. Date: Jan. 9, 2020

(65) Prior Publication Data
US 2021/0182997 A1   Jun. 17, 2021

(30) Foreign Application Priority Data
Jul. 5, 2018   (EP) .................... 18181934

(51) Int. Cl.
*G06Q 10/08* (2024.01)
*G01C 21/34* (2006.01)
(Continued)

(52) U.S. Cl.
CPC ......... *G06Q 10/08* (2013.01); *G01C 21/3469* (2013.01); *G06Q 10/06315* (2013.01); *G08G 1/0112* (2013.01); *G08G 1/22* (2013.01)

(58) Field of Classification Search
CPC ..... G01C 21/3469; G08G 1/0112; G08G 1/22
See application file for complete search history.

(56) References Cited

U.S. PATENT DOCUMENTS 9,355,423 B1    5/2016 Slusar
9,940,840 B1*   4/2018 Schubert ............ G01C 21/3407
(Continued)

FOREIGN PATENT DOCUMENTS

EP    3392856 A1    10/2018

OTHER PUBLICATIONS

"International Application Serial No. PCT/EP2019/068008, International Search Report mailed Oct. 8, 2019", (Oct. 8, 2019), 4 pgs.
(Continued)

*Primary Examiner* — Jelani A Smith
*Assistant Examiner* — Nada Mahyoob Alqaderi
(74) *Attorney, Agent, or Firm* — Schwegman Lundberg & Woessner, P.A.

(57) ABSTRACT

A method and system for distributing cost of platooning trucks, are discussed. The method comprising a step of receiving (S301, S302) at least two platooning requests and determining (S303), based on said requests, a platooning plan comprising which is determined to reduce a combined estimated resource consumption. The method further comprises the step of determining (S304) at least one estimated resource gain distribution for the vehicles (501, 502, 601, 602) associated with the platooning plan and determining (5305) an estimated compensation associated with each vehicle (501, 502, 601, 602) based on the estimated resource gain distribution. The method further comprises receiving (5306) sensor data collected while platooning of the vehicle (501, 502, 601, 602) associated with the user devices (100; 100*a;* 100*b;* 401; 402), and determining (S304), an updated compensation associated with at least one vehicle (501, 502, (Continued)

Figure 1:
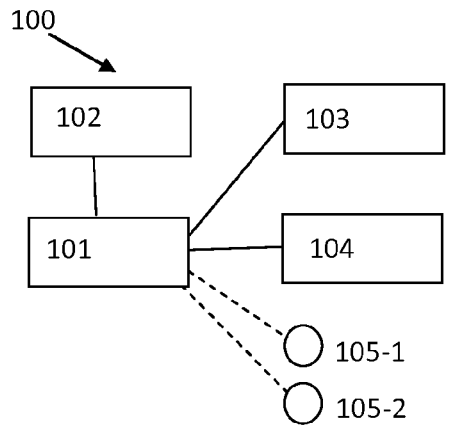

601, 602) based on the estimated compensation associated with the respective vehicle (501, 502, 601, 602) and the received sensor data.

16 Claims, 3 Drawing Sheets

(51) Int. Cl.
*G06Q 10/0631* (2023.01)
*G08G 1/00* (2006.01)
*G08G 1/01* (2006.01)

(56) References Cited

U.S. PATENT DOCUMENTS

| | | | |
|---|---|---|---|
| 2010/0256852 A1* | 10/2010 | Mudalige | G08G 1/164 701/24 |
| 2016/0054736 A1* | 2/2016 | Kolhouse | G08G 1/0175 701/96 |
| 2017/0293296 A1* | 10/2017 | Stenneth | G06Q 10/06315 |
| 2017/0349176 A1 | 12/2017 | Alden et al. | |
| 2018/0018605 A1* | 1/2018 | Light-Holets | G06Q 10/06 |
| 2018/0364725 A1* | 12/2018 | Lonari | G01C 21/3469 |
| 2019/0130765 A1* | 5/2019 | Tulpule | G05D 1/0293 |
| 2020/0082727 A1* | 3/2020 | Zhao | G05D 1/0295 |

OTHER PUBLICATIONS

"International Application Serial No. PCT/EP2019/068008, Written Opinion mailed Oct. 8, 2019", (Oct. 8, 2019), 8 pgs.

Larson, Jeffrey, et al., "Coordinated route optimization for heavy-duty vehicle platoons", 16th International IEEE Conference on Intelligent Transportation Systems, (2013), 7 pgs.

* cited by examiner

METHOD AND SYSTEM FOR DISTRIBUTING THE COSTS AMONG PLATOONING VEHICLES BASED ON COLLECTED SENSOR DATA

PRIORITY APPLICATIONS

This application is a U.S. National Stage Filing under 35 U.S.C. § 371 from International Application No. PCT/EP2019/068008, filed on Jul. 4, 2019, and published as WO 2020/007987 on Jan. 9, 2020, which claims the benefit of priority to European Application No. 18181934.3, filed on Jul. 5, 2018; the benefit of priority of each of which is hereby claimed herein, and which applications and publication are hereby incorporated herein by reference in their entirety.

The present application is directed at a method and system for determining and distributing the cost among platooning vehicles based on information regarding the vehicles and on sensor data collected by the vehicles.

Delivery of goods and freight is currently, and will likely in the future, mostly achieved by motor vehicles travelling on roads, as vehicles travelling on roads are generally able to reach more locations than other means for freight delivery such as trains, ships or airplanes. Roads, however, are also used by non-commercial travel and are operating under a high workload. The average daily traffic on German highways has increased considerably over the past 20 years and the ratio of commercial heavy duty vehicles on German highways has remained at about 15% over the past 30 years. Thus, in order to cope with increasing traffic, new measures for increasing traffic efficiency are needed.

Traffic management of utility vehicles operates using complex fleet management systems for route planning. Such systems are utilized by the operator or driver in order to optimize the routes for resource consumption including resources such as working times, fuel and/or energy consumption as well as emission. Such management systems are centered around the objective of delivering freight from one location A to another location B at a competitive cost. Such management systems are furthermore connected to current traffic and/or vehicle data in order to plan the routes in an optimized manner.

One option for further reducing the cost of utility vehicle operation is by allowing vehicles to travel together, preferably closely behind each other in a so-called platoon. The term "platooning" may, thus, refer to a system that vehicles use on the road in which at least two trucks drive in a tight convoy on a freeway, supported by technical driving assistance and control systems. All of the vehicles in the platoon are preferably linked to each other by an electronic "drawbar". This may be achieved by communicative coupling of the electronic systems of the respective vehicles, so that the vehicles may automatically adjust their speed based on the current speed of the other vehicles in the platoon. In particular, through communicative coupling of the vehicles, the vehicle travelling behind another vehicle may automatically brake as soon as the vehicle in front starts braking, thereby allowing for short distances between the vehicles. The truck in front sets the speed and direction, and the others follow.

Platooning can have the advantageous effect of saving fuel or energy as well as emissions, in particular for the vehicles which are travelling closely behind another vehicle of similar size. Furthermore the wearing out of the vehicles might be reduced through platooning, again in particular for vehicles which are following in a platoon. It is generally assumed that a fuel reduction of about 10% or more in combination with a similar reduction in $CO_2$ emission is possible for vehicles operating on conventional fuels.

As it is also described in Larson et al.: "Coordinated Route Optimization for Heavy-duty Vehicle Platoons", in ITSC 2013, drivers and operators of commercial vehicles generally do not like to slow down in order to wait for another vehicle with which they can form a platoon. Thus, the only option for forming a platoon is by instructing another vehicle to increase its speed in order to catch up with a leading vehicle. Due to speed limits and high density traffic, it is however often difficult for a vehicle to catch up with another vehicle if the leading vehicle does not slow down at the same time.

It is therefore an objective of the present application to provide a method which allows for an improved framework for allowing the forming of multi-vehicle platoons, which can be operated in a cost, energy and/or emission efficient manner, thereby improving the efficiency of commercial road and highway traffic. Furthermore, the method described in the present application also allows for estimating and updating an energy, emission and/or cost distribution between the vehicles, e.g. based on sensor data of the particular vehicle collected before and/or during the platooning.

The present application is directed at a method for determining and/or updating a cost, resource and/or emission distribution and for distributing cost (monetary or energy or emission related) among platooning trucks, wherein a platooning server is used in order to manage the platooning trucks and negotiations of the trucks in order to determine and enable payment between the operators of the participating vehicles based on sensor data collected by or from the individual trucks.

In the following the term "vehicle" and "truck" is used for ease of notation to refer, in general to cars and trucks of all types and sizes. Preferably, platooning vehicles are heavy duty trucks over 12 tons including truck tractors, semitrailers, preferably with trailers having three axles, such as vehicles in European vehicle categories N2, N3 and American vehicle classes 7 and 8 as well as comparably sized vehicles in Asia or other jurisdictions. Platooning is also possible with vehicles off all sizes, however a platoon should preferably be made up of similarly sized vehicles, as long as draft is being reduced when said vehicles are travelling closely behind each other, thereby creating an economical (and additionally also an ecological) advantage.

The terms cost and/or compensation may refer to monetary cost or compensation as well as nonmonetary cost or compensation. A cost may be expressed in units of a currency, but also in terms of time, computational cost, a quantity of fuel or energy, emission certificates, required time and/or man power etc. A compensation may also be expressed in units of a currency or in other, nonmonetary units as discussed with respect to the term "cost". Furthermore, a compensation, as discussed below, may also refer to fuel or energy or emission credits which are transferred from one operator to another operator or to any other agreement wherein a first operator offers either services or goods to a second operator in exchange for (potentially different) services or goods which are received by the first operator from the second operator. The exchange of goods or services as compensation may include immediate compensation, where the respective goods or services are immediately received after an agreement is entered, or at least a part of the respective compensation may also refer to good and/or services which may have already been received or which will be received or transferred in the future.

For example, cost or compensation may include a cash-free service which is provided en route to the transport business on motorways and traffic roads, or respective credits regarding cash-free services offered by a third party vendor.

Each of the vehicles in the following description is equipped or associated with a user device, through which at least a portion of the communication with respect to said vehicle is handled. The user device may, for example, be a mobile phone or other mobile device, which is connected to the on-board electronic system of the respective vehicle using, for example, a Bluetooth or 2G, 4G, 5G, WLAN or any other wireless connection according to past, current or future standards. In principle, there are at least two distinct possibilities for communication of messages between the vehicles and between a vehicle and the infrastructure such as the platooning server. Such communication may take place using the 5.8 or 5.9 GHz band, using wireless LAN technology as well as its past, current and future advancements in accordance with the European ETSI ITS-G5 standard, the US IEEE802, 11p WAVE standard or the like. Alternatively, data can be transmitted using cellular mobile networks of the third (UMTS) or fourth (LTE) generation or any future LTE based or faster equivalent communication standard.

The user device may be on-board the vehicle or it may be remote to the vehicle and only communicatively connected to the vehicle using, e.g. a mobile phone or other network connection. Alternatively, the user device might be connected to the vehicle's on-board system using a wired connection. The user device could also be a fixedly-installed device, which is either part of the on-board system of the vehicle or fixedly installed within the vehicle. In general, user devices have a user interface, through which they can be operated by a user such as a driver of the vehicle. The user device may also be accessed and/or operated by a remote interface, for example by a remote user such as a fleet manager or operator of the respective vehicle. As the user device is connected to the vehicle's on-board system, the user device can collect and access sensor data collected by sensors of the vehicle.

With respect to said sensors, the vehicle can be equipped with cameras or other visual sensors, such as infrared or radar/LiDAR based sensors for observation of the surroundings of the vehicle. Said imaging data can furthermore be preprocessed for object detection and classification using a respective system, which may preferably be a self-learning system. Furthermore, visual sensors can also be used for distance detection either between the vehicles in a platoon or between the current vehicle and a peripheral object such as a car, tree, person, animal etc. Using visual or other sensors, it is also possible to detect or measure the distance which has been travelled. Radar or LiDAR sensors can also be used for object detection and for static or dynamic velocity measurement.

For platooning, in general, high precision yaw rate sensors may be desired, wherein such sensors preferably have precisions with a maximal deviation of only around 30 to 50 cm, preferably under 10 cm, per 200 m driving distance. For example, such yaw rate sensors may be constructed as MEMS-based yaw rate sensors in order to also achieve a rather small, light weight and easy to manufacture sensor, in comparison to other sensors, such as optical fiber sensors. Sensors which are to be used for platooning vehicles should preferably also be equipped with some sort of fail-operation modus, so that a sensor failure can be detected, and the respective platoon may be dissolved before any damage occurs. It is furthermore also possible that a sensor, such as a yaw-rate sensor in a component in a sensor-fusion system comprising several sensors and combining data collected from, for example, one or more radar sensors, cameras, (axial) velocity sensors, for example collected from the antilock braking system, and WLAN signals from other vehicles or infrastructure, and satellite based navigation systems, in combination with yaw rate sensors in order to, for example, precisely locate the vehicle, while providing for sensor redundancy at the same time.

The sensors, such as the yaw rate sensors and also other sensors discussed herein are also described in detail in Tille (eds.): "Automobil-Sensorik 2", ISBN 978-3-662-56309-0.

Furthermore, in general, the vehicle can comprise velocity sensors, and/or sensors for detecting temperature (air temperature, surface/road temperature, engine temperature etc.), for detecting and/or measuring humidity and/or rain. The vehicles can also comprise sensors and respective systems for GPS navigation and/or interactive geo-referencing in combination with sensors for position detection and/or navigation.

Vehicles can furthermore comprise, e.g., pressure sensors for determining energy usage with respect to fuel consumption or sensors for statically or dynamically determining current charging status of a battery (also known as intelligent battery sensors), in order to determine and, if possible manage or control the different devices which are using energy within the vehicle. Sensors for battery management can for example be sensors for determining voltage or fiber sensors for determining the charging status.

Also, the vehicles can comprise sensors and collect sensor data which describe the movement of the vehicle, such as sensors for detecting the steering angle, rotary speed, velocity, pressure, temperature, emission, trajectory and/or fuel consumption. For example, fuel consumption may be measured differently, using respective sensors based on the type of engine. For example, some vehicles which may enter into a platoon in accordance with the method described herein may be running on natural gas or compressed natural gas or liquefied natural gas.

An amount of emission with respect to $CO_2$ emission is preferably measured in g/km. Emission can be measured directly by respective emission sensors or may be deduced from other measured data such as temperature, humidity, fuel consumption, distance travelled in combination with a respective emission factor in accordance with, e.g., DIN 16258. $CO_2$ emission can be dynamically determined during a drive or statically determined using a vehicle test stand. Emission can be measured using sensors for NOx concentration, sensors for measuring atmospheric particulates and/or particle filters, sensors for measuring the exhaust temperature and/or exhaust pressure, sensors for SCR (selective catalytic reduction)-levels and temperature, sensors for measuring quality and dosage of urea solution and/or sensors for monitoring exhaust gas recirculation.

It is also possible that, today or in the future, measurements or estimates for $CO_2$ emission of individual vehicles or of the platoon as a whole may form a basis for the purchase or trading of emission certificates as well as for granting or purchasing permits or licenses, for example using a bidding process, in which vehicles or vehicle fleets or platoons with particularly low emission may be awarded emission based licenses ahead of other vehicles or fleets with higher emissions. As the overall emission decreases from platooning vehicles, platooning may well provide an advantage in obtaining emission based licenses or permits.

Furthermore, the vehicles can comprise sensors for measuring tire pressure, electronic stability control, crash detection and/or warning sensors, sensors for adaptive cruise control, LiDAR sensors with MEMS-scanners as well as sensors for detection and protection of pedestrians.

The vehicle can furthermore comprise sensors for determining the weight of the vehicle, in particular the weight of the current freight, which can then be combined with the known vehicle weight to determine a total, combined weight of the vehicle carrying the current freight.

Above, the different sensors are described with respect to their respective purpose. However, sensors can also be categorized or sorted based on the level of reliability and/or trustworthiness associated with the respective sensors. By law, certain sensors are required to be reliable, and tempering with said sensors is a punishable offense. These high-reliability sensors can, for example, be gauged or calibrated to a high reliability or certified. High-reliability sensors are also sometimes referred to as sensors that cannot be manipulated, even if manipulation is technically possible, as manipulation or spoofing or tempering with these sensors in any way carries hefty legal implications such as, e.g., losing the license for the respective vehicle, vehicle confiscation, monetary punishment or even jail time for the vehicle owner.

Data which is provided by high-reliability sensors may also be referred to as high-reliability sensor data.

The group of high reliability sensor data, comprises, e.g., data from sensors associated with trip recorders or tachographs, fulfilling requirements of liability described for example in Regulation (EC) No 561/2006 This includes sensors which measure the speed and the distance travelled. The data collected by high reliability sensors is associated with the driving speed and also with driving times and durations as well as the time spent behind the wheel by the individual drivers. This data is primarily used for determining the driver time, driving brakes, speed, driven distance and others, see for example http://www.bgl-ev.de/images/downloads/service/gesetze/vo_eg_561-2006.pdf.

Besides the high-reliability sensors, each vehicle may also be equipped with further lower reliability sensors, which may optionally be grouped into medium and/or low reliability sensors. The term "lower reliable sensor" may, thus be used to describe for example sensors which are subject to a different, less severe level of hefty legal implications if malfunctioning. For example, lower reliability sensors may be used, for measuring energy levels and consumption. Lower reliability sensors may thus include fuel consumption sensors, different kinds of pressure or temperature sensors, which measure consumption of injected fuel, as well as intelligent battery sensors or other sensors associated with battery cells, which also provide data associated with the current state of the battery and thereby provide data for energy consumption of PHEV or EV, see also "Automobil-Sensorik", Thomas Hille (eds.), Heidelberg, 2016; "Sensoren im Kraftfahrzeug", Konrad Reif (eds), Heidelberg, Wiesbaden, 2016.

Sensors with lower reliability may also provide data for determining emission, such as particle sensors and/or Mid-Infrared gas sensors for determining data to provide Energy and Gas emission equivalents. (Popa, Daniel; Udrea Floring, Towards Integrated Mid-Infrared gas Sensors, Department of Engineering, Univeristy of Cambridge, May 2019). Currently, emission, such as nitrogen dioxide, greenhouse gases, carbon dioxide and particles, is mostly determined on a test stand and not directly determined while driving on the road. However, it is possible to infer emission levels from other sensor data, such as fuel consumption data using additional data from publicly accessible data sources, like DIN 16258.

It is, however, also possible to use individual emission sensors for each vehicle, for example based on Mid-Infrared Sensors or particle sensors.

The lower reliability sensors also include so-called rotation rate sensors which enable the determination of the driving direction and thus determine the position of the vehicle by dead reckoning with GPS, speed and distance navigation. "Sensoren im Kraftfahrzeug", Konrad Reif (eds), Heidelberg, Wiesbaden, 2016.

Lower reliability sensors furthermore also may include external sensors which provide data regarding the landscape or topography of the planned route, which may be obtained through GPS data of the navigation system and digital maps which include data regarding slopes of the planned route, see e.g. "Kraftstoffverbrauch and Verbrauchsoptimierung", M. Hilgers, ISBN 978-3-658-12751-0, 1. Auflage 2016.

Furthermore, data collected from remote, external sensors, may also be used when distributing cost between platooning vehicles. Data collected from remote, external sensors may for example comprise weather or environmental data or data from other vehicles which are not part of the current platoon.

In a first step of the described method, the platooning server receives at least two platooning requests, each of which is sent by a user device associated with a distinct vehicle, wherein each platooning request comprises a start location and an end location. Optionally the platooning request may comprise additional data such as a planned start time or a desired time of arrival. The platooning request could furthermore comprise information regarding the vehicle, such as a size of the vehicle, a brand of the vehicle, a commercial vehicle class or other information useful in determining which vehicles can form a platoon, as energy and resource saving is greatest when vehicles which form a platoon have a similar size.

Preferably, each vehicle which is equipped for platooning routinely collects preliminary individual sensor data and/or preliminary individual resource consumption data when travelling alone, so that said preliminary individual sensor data of each of the vehicles participating in a platoon can then be used when estimating the resource consumption of a platoon comprising said vehicles. As the de-facto resource consumption of a vehicle may differ depending on the freight as well as current environmental conditions (such as weather, road conditions, elevation, incline etc.), such preliminary individual sensor data and preliminary individual resource consumption data is preferably collected right before the platoon is formed or at least during the same trip or, if that is not possible, during a trip which was taken in the past under similar conditions (similar weather conditions, similar freight or at least weight of freight). Ideally, the preliminary individual resource consumption data is normalized or collected under carefully constraint conditions, for example while travelling at a constant speed on a straight road or highway with little or no incline.

In a next step, the platooning server receives said preliminary individual resource consumption and preferably preliminary individual sensor data for each of the vehicles. The preliminary individual data received may include several different values associated with different sensors.

In a next step of the method a platooning plan is determined by the platooning server, wherein the platooning plan comprises, for each vehicle, a platooning route comprising a first individual section, a platooning section, and a second individual section. The platooning plan is determined or selected from, potentially, several possible plans to reduce a combined estimated resource consumption. The platooning plan could, for example be determined to be the plan with the shortest overall length. Alternatively, several potential plans could first be determined, for example by using a route planning system which is configured to optimize the travel time and/or length of a planned route. The platooning server could then determine the platooning plan from the potential plans based on the length of the platooning sections, or based on the estimated resource consumption associated with each of the potential plans, where the estimated resource consumption may be determined using previously collected data.

The resource consumption may relate to the (estimated) consumption of fuel or energy of the respective vehicles during the planned trip. The resource consumption may also relate to the wearing out of the vehicles which is estimated for the trip. In general the wearing out of the vehicle following in a platoon may be assumed as lower than the wearing out of the vehicle which leads the platoon. For example, the risk of damage to the vehicles windshields or headlights or other external parts, such as tires, mirrors etc. may be lower if a vehicle is following in a platoon. Furthermore, the resource consumption may also refer to human resources, such as working hours of the drivers associated with the vehicles. In some instances, and provided that the appropriate legal framework, it may be possible that drivers leading a platoon receive more pay than drivers following in a platoon or that drivers which are following may be allowed to rest or may be absent.

The combined estimated resource consumption may, for example be improved or optimized in comparison to the sum of the estimated resource cost needed by each vehicle when travelling individually from the associated start location to the associated end location. This sum of the individual estimated resource consumption may then be compared with the combined resources, or their respective cost, needed when at least some of the vehicles are joined into a platoon for at least a portion of the journey. In order to determine an improved, or ideally optimal, platooning plan, the platooning server may first determine the estimated combined resource consumption and then determine potential routes, calculate a combined estimated resource consumption for each route and select the route with the smallest, i.e. the most optimal, combined estimated resource consumption. The platooning route of a vehicle may also comprise more sections, potentially several platooning and intermediate individual sections, depending on the platooning plan. It is also possible that the first and/or second and/or a last individual section is empty or very short, for example if several of the vehicles are starting from the same location or have the same destination or end location.

In general, a platooning plan is a schedule for multiple vehicles, each of which has a start and end location, wherein the platooning plan specifies the platooning routes of each individual vehicle including where to form and/or dissolve a platoon as well as positioning of each individual vehicle within the platoon. A platooning plan might include several distinct platooning sections or platooning sections with varying vehicles or vehicles in varying order.

A platooning route is a single vehicle portion of a platooning plan, i.e. the scheduled events of the platooning plan, which are intended for one specific vehicle. If, for example, three vehicles participate in a platooning plan, then said platooning plan comprises three individual platooning routes. While platooning plans and platooning routes might have desired start and end times associated with them, they are still merely a plan, which may or may not be carried out. The term "platooning trip", on the other hand, refers to the actual carrying out of the plan or route by the respective vehicles, i.e. during the platooning trip of a vehicle associated with a platooning plan, said vehicle is actually travelling along the platooning route associated with said vehicle.

The estimated combined resource consumption may be an absolute or a relative number. An absolute resource or energy consumption could, for example, be expressed in terms of a quantity of fuel, such as liters of conventional fuel, quantities of emission or kW/h for electric vehicles. A relative resource or energy saving may be expressed as a percentage of energy or fuel, which is expected to be saved. In most scenarios, the information transmitted by the user devices of the vehicles to the platooning server may be insufficient for determining an absolute resource or energy saving. Rather, the platooning server may only estimate a relative resource or energy saving based on, e.g. the possible platooning routes and the speed limits and/or platooning restrictions along the route. Depending on the information provided to the platooning server by the individual vehicles, the size of the vehicles, the vehicles emission, the brand or age of the vehicle, the weight and information regarding the freight, may also be taken into account.

When determining a relative or absolute estimated resource or energy saving, the calculations of the platooning server may be based on values stored in a memory associated with the platooning server, wherein said values were, potentially, determined during test runs of similar vehicles, during similar conditions (regarding, e.g., traffic density, weather, road conditions, freight etc.). More preferably, the values may have been collected by the vehicles associated with the current platooning plan, preferably during the same trip shortly before the beginning of the platooning, so that environmental and/or other external conditions as well as freight conditions are very similar or even identical to the conditions during the planned platooning. Furthermore, the values stored in the memory may be updated based on data collected from the sensors of vehicles while driving. The prediction of the estimated resources consumed by one or more vehicles travelling either alone or in a platoon, may be implemented using machine learning algorithms and may be self-learning in the sense that the parameters of the algorithms are updated based on sensor data (such as data collected from the sensors discussed above), collected from the vehicles.

After a platooning plan has been determined by the platooning server based on improving a combined estimated resource consumption, the method comprises a step of determining, by the platooning server, at least one estimated resource gain distribution for the vehicles associated with the platooning plan. A resource gain distribution shows the estimated resource gain, i.e. the difference between, on the one hand, the resources or their associated cost which would be used if the vehicle was travelling alone and, on the other hand, the resources or their associated cost which would be used if the vehicle was travelling according to the platooning plan, of each vehicle in combination with or in comparison to the estimated resource gain of the other vehicles. There may be more than one determined resource gain distribution if there are more than one possible orderings of the vehicles. Generally, platooning is most efficient if all vehicles are of a similar size or if the smaller vehicles travel behind larger vehicles. However, due to the optional positioning preferences of the individual drivers or other technical constraints, not all vehicles orderings might actually be feasible.

When calculating the resource gain distribution, the preliminary individual resource consumption data of each vehicle needs to be into account, for example as a scaling factor. This way, each vehicle, or associated driver or owner, receives a fair fraction of the resource consumption savings resulting from platooning of the vehicles. Thus, the resource gain, i.e. the resources which are saved by platooning and their respective associated cost, are distributed across the different owners of the respective vehicles.

Generally, the vehicle leading the platoon has the lowest individual resource saving, while at the same time requiring the most strenuous work for its driver. Thus, in order to create an incentive for a leading vehicle, in particular when platoons are formed with vehicles from different fleets, the operator or driver of the leading vehicle might receive compensation from the operators of the following vehicles. The resource gain distribution determined by the platooning server may be an absolute or relative resource gain distribution, depending on the data which has been provided to the platooning server from the individual vehicles.

When determining the initial resource gain distribution, the following data may, in particular, be taken into account:
Sensor data associated with resource consumption of the individual vehicles collected before the platooning; and
Estimated combined resource consumption of the vehicles when platooning.

The estimated combined resource consumption (which can, e.g. be expressed as a resource consumption per time or distance travelled) of the vehicles may be calculated by using a weighted sum of the resource consumption of all of the vehicles over the respectively travelled distance or time (wherein the individual resource consumption is determined based on the preliminary individual sensor data collected for each vehicle before the platooning), such as $\rho_{i=1}{}^n w_i \cdot r_i$, where $1 < i \leq n$, where n is the number of vehicles in the platoon, preferably n=2 or n=3, although longer platoons may become possible in the future. The number $r_i$ refers to the resource consumption of the $i^{th}$ vehicle, where the respective resource may be fuel, emission, driving times or may refer to a measurement of cost associated with the any of the resources. The weighting or scaling factor $w_i$ is the estimated saving for each vehicle, depending on the position of the vehicle and for example also depending on other external factors, such as driving distance required due to weather conditions.

If several different types of resources are taken into account, then the resources may also be expressed as a vector of at least two different types of resources considered. For example, fuel consumption as well as driving times may be considered independently this way. In this case, also the weights $w_i$ may be vectors, for example the weight of the fuel consumption may be different from the weight associated with driving times or wear-and-tear associated with the respective position.

After the user devices associated with the vehicles have received the platooning plan as well as the estimated resource gain distribution associated with the platooning plan, the method comprises a further step of determining, by the platooning server and/or the user devices, an estimated compensation associated with each vehicle based on the estimated resource gain distribution. The determining of the compensation associated with each vehicle may, additionally, also be based on the platooning plan and/or additional vehicle data. The estimated compensation associated with each vehicle may, for each individual vehicle, be a positive or negative compensation, which may reflect the relative savings of said vehicle (or its respective driver or operator) in comparison to the relative savings of the other vehicles through participation in the platoon. The compensation, which may be monetary or, alternatively, comprises resource credits, emission certificates etc., is paid by or awarded to each vehicle, may be determined through an automated or semi-automated bidding process, wherein each user device first determines a compensation threshold which said user device either expects or is willing to offer when the associated vehicle participates in the platoon, wherein the compensation determined by each user device is calculated based on the estimated resource gain distribution and additional sensor data or sensor measurements collected by the vehicle, or additional physical data or measurements of the vehicle.

The user devices then transmit their determined compensation thresholds to the platooning server, which determines whether there is a "valid" compensation distribution, i.e. whether the positive and negative compensation thresholds match, so that the demands of all different user devices and associated operators can be met. If there is more compensation offered than requested, a valid compensation distribution exists and the platooning server may automatically, using, e.g. machine learning algorithms and data and measurements collected in the past, determine such a compensation distribution. If more compensation is requested than offered, the platooning server may still determine a compensation distribution but with individual estimated compensations which do not match the thresholds and transmit the determined individual estimated compensations to the respective user devices, which may then accept the estimated individual compensation, or provide another offer with an updated compensation threshold. This way, eventually, either an agreement between the user devices is reached by way of the platooning server, or the negotiations are eventually stopped, which means that it was not possible to find a compensation distribution which is accepted by all participants, so that no platoon is formed.

The estimated compensation distribution may, thus, amount to a payment plan, based on which the operators of some vehicles receive compensation from the operators of other vehicles. Compensation is not necessarily monetary, but could also include emission certificates, fuel credits etc. The payment plan may be transparent in the sense that the operators of all participating vehicles may access the conditions of the payment plan. However, when there are three or more vehicles participating in a platooning plan, it is also possible that each individual vehicle or operator only has knowledge regarding its own associated estimated (positive or negative) compensation, without knowing the estimated compensation of the other vehicles. Based on the platooning plan and the estimated cost associated with each vehicle, the platooning server may request the vehicles to signal their intention to participate in the platooning plan. Preferably any compensation only becomes payable after the vehicles have actually connected to form a platoon in accordance with the platooning plan. Also, if one vehicle leaves the platoon earlier than originally intended by the platooning plan, the compensation is adjusted accordingly.

After the platooning trip of at least one of the participating vehicles has begun, the method furthermore comprises the step of receiving, by the platooning server, from at least one of the user devices, sensor data of the vehicle associated with the user device, wherein said sensor data is collected by on-board sensors of said vehicle during the platooning trip. The sensor data may, for example, include data collected from high reliability sensors such as velocity sensors, distance sensors, and/or from other, lower reliability sensors, such as visual or optical sensors of the vehicle's surroundings, sensors indicating a fuel or energy consumption or other sensors as described above. After the platooning server receives sensor data collected by on-board sensors of at least one of the vehicles participating in the platooning trip, the platooning server may, if necessary, calculate an updated resource distribution and updated compensation associated with at least the respective vehicle and based on the estimated cost associated with said vehicle and the received sensor data.

Upon receiving sensor data collected during the platooning trip from at least one vehicle, it is first determined, preferably by the platooning server, if the received sensor data is in conflict with the estimated combined resource consumption, such as for example, whether the received sensor data indicates a higher resource consumption than the estimated resource consumption for that vehicle. If such a higher resource consumption (or, similarly, a lower resource consumption) is indicated by the received sensor data of said vehicle, then the platooning server may request additional sensor data in order to determine whether the resource gain distribution for all vehicles needs to be adapted, or if the higher (or lower) resource consumption is only due to a different resource consumption of the individual vehicle.

To determine if the estimated resource gain distribution needs to be updated, the platooning server may request additional sensor data of the same vehicle, preferably sensor data which has a higher reliability (such as data originating from a high reliability sensor) associated with it than the previously received sensor data. This way, it can, for example, be determined if, e.g., one of the sensors is malfunctioning or if the increased (or decreased) resource consumption may be due to a problem with said vehicle, such as a different tire pressure or higher or lower weight of freight than what was previously known or assumed.

Alternatively or additionally, the platooning server may also request additional sensor data from at least one other vehicle travelling in the platoon in order to compare the received sensor data of at least two different vehicles in order to determine if, for example, several or all of the platooning vehicles are showing similar or related deviations (while, preferably, taking into account scaling of the resource consumption associated with the ordering of the vehicles within the platoon) from the previously estimated resource consumption. Preferably, the platooning server requests sensor data from at least two distinct sensors of which at least one sensor is a high reliability sensor, so that the resource consumption of the vehicles can be reliably assessed and compared among at least two vehicles in the platoon.

Alternatively or additionally, the platooning server may also request external data, such as weather data, GPS data, or data associated with road conditions in order to determine whether a higher or lower resource consumption than what was estimated is the result of external conditions, which similarly affect all platooning vehicles or if the changed resource consumption is only due to an individual condition of one of the vehicles.

This process may also be referred to as a validation or verification of the received sensor data, as the comparison of sensor data received from different sensors of the same vehicle or from sensors of at least two distinct vehicles, can also serve to verify that the respective sensors are operating reliably, or to validate the received data.

If it is determined that the estimated resource gain distribution needs to be updated, the platooning server is further configured to determine an updated resource gain distribution and updated compensation associated with at least one vehicle based on the estimated resource gain distribution, the estimated compensation associated with the respective vehicle and the received sensor data. For example, the updated resource gain distribution can include all vehicles using more or fewer resources than what was originally estimated.

The platooning plan may include the start and end location for each vehicle as well as the locations where platoons involving said vehicle are formed or, respectively, dissolved. Furthermore, the platooning plan may comprise an estimated compensation value, which is either received by the operator of said vehicle, or which needs to be paid by the operator of said vehicle, when participating in the platooning plan. The platooning plan may, furthermore, include the data on which the estimated compensation was based, i.e. which parameters with respect to e.g. traffic density, weather conditions, vehicle distance, planned stops etc. were used by the platooning server when determining the estimated resource distribution. The platooning trip agreement may further comprise a maximum adjustment value, which is the maximum value by which the estimated compensation may be adjusted, i.e. updated, based on sensor data collected by said vehicle or other vehicles during the platooning trip. The platooning plan may, additionally, also comprise the preliminary individual resource consumption data or at least information regarding the preliminary individual resource consumption data for the participating vehicles.

For example, if inclement weather conditions make is necessary for the platooning vehicles to keep a greater distance between each other, the combined estimated resource consumption as well as the estimated resource gain distribution needs to be updated by the platooning server, based on which the compensation value may change. However, the compensation value may be capped by a value specified in the platooning agreement, and the platooning agreement may also specify conditions under which the compensation distribution may be adapted. Also, if a vehicle drops out of a platoon before the platooning trip according to the platooning plan is finished, the compensation also needs to be adjusted, for example based on the distance or time travelled so far and/or based on the sensor data collected by the platooning vehicles.

As already indicated above, the estimated compensation may be determined by the platooning server and/or the individual user devices by the following method steps. First an individual positioning preference as well as an individual compensation threshold is determined by each of the user devices, wherein each user device bases its calculations on the at least one estimated resource gain distribution and on additional vehicle specific data, such as data regarding the resource consumption associated with this vehicle. The determined positioning preference and individual compensation threshold is then sent to the platooning server. Afterwards, the platooning server determines, based on the received individual positioning preference as well as the individual compensation threshold of each of the user devices, a vehicle ordering as well as an estimated compensation associated with each vehicle.

As the described method is, in particular, suitable for vehicles of different fleets, the cost and/or resource saving associated with a determined resource saving may differ from vehicle to vehicle, depending on the type of fuel or energy which is used by the vehicle, the technology used within the vehicle (with newer vehicles often being more energy efficient than older vehicles) as well as payment received by the driver, which may differ depending on the individual contract of the driver or whether the driver is leading or following in a platoon. Preferably, data which indicates which driver is actively driving, i.e. leading, a platoon and data which indicates which driver is following in a platoon is separately collected. Said data is not vehicle specific, but rather driver specific, as drivers may change vehicles from time to time. The type of freight and the weight of the vehicle, as well as the tires used may also play a role in determining an actual, absolute value, cost and/or resource saving associated with a received platooning plan and resource gain distribution.

Consequently, there may be a preference with respect to the position taken within a platoon, for example based on the working hours of the driver or on current fatigueness levels of the driver. Therefore, in some cases, a driver or operator may prefer to lead a platoon and receive compensation in return, or a driver or operator may prefer to follow in a platoon, thereby possibly reducing the wearout of the vehicle and/or allowing the driver to rest. With technological advances in autonomous driving, it is also possible that the drivers following in a platoon may not be required to be attentive while the vehicle is joined into a platoon as a following vehicle. The driver could, therefore, have a rest or even sleep while his vehicle is effectively steered by the driver of the platoon leader.

It is furthermore also possible, that at least one of the following vehicles is driverless and steered through the platoon leader in combination with the vehicle's platooning and autonomous driving system. In such a scenario, the vehicle would be dropped off at a meeting location by its own driver and would then be joined into a platoon with the platoon leader. At the end of the trip, the platoon leader would move the following vehicle to a second meeting location, where the platoon is disconnected and the formerly driverless vehicle can then be picked up by a another driver. If the driver in at least one of the following vehicles is resting during the platooning or at least one of the following vehicles is driverless, then the estimated compensation which is paid by the operator of said following vehicle might increase, while the compensation received by the operator of the platoon leader might also increase due to the additional responsibility and time required in order to pick up of drop off a driverless vehicle. Whether or not a vehicle is preferably driverless, travelling with a resting, inactive driver or travelling with an active driver might be included in the platooning request received by the platooning server from the vehicle. Furthermore, whether and when the driver of a vehicle is inactive or absent might also be included in the platooning plan.

When sensor data is collected by at least one of the vehicles during a platooning trip, then said sensor data might, optionally, be collected continuously or at short intervals, for example at intervals which are only a few minutes apart. Continuous or quasi-continuous collection of sensor data increases the accuracy of an updated estimated resource gain distribution. Alternatively, the collection of sensor data, which is intended for transmission to the platooning server, may be intermittent or triggered only when a predetermined threshold of at least one measured sensor data is exceeded.

Preferably, the platooning request may also comprise at least one physical information regarding the vehicle, such as a vehicle class and/or a size and/or weight of the vehicle or information regarding the vehicle's fuel or energy consumption or the vehicle's emission. Other physical information may include information regarding the vehicle's age or brand or the type of freight currently carried by the vehicle. Furthermore, the platooning request may already include a positioning preference for at least one of the vehicles. Additional vehicle specific data which is preferably utilized in determining the estimated compensation associated with each vehicle, may preferably comprise at least one of: information regarding the fuel or energy consumption of the vehicle, information regarding the vehicle's freight, information regarding the working hours of the driver of the vehicle, an individual cost associated with leading a platoon, an individual cost or resource saving associated with following in a platoon.

It is optionally furthermore possible for an additional vehicle to join a platooning plan either before or after the individual vehicles have started their platooning trip in accordance with the platooning plan. In particular it is optionally possible that after a vehicle ordering as well as an estimated compensation associated with each vehicle have been determined, based on the individual positioning preference as well as the individual cost threshold received from each of the user devices, an additional platooning request from an additional user device associated with an additional vehicle may be received by the platooning server, wherein the additional platooning request comprises a start location and an end location.

After an additional platooning request is received, an additional platooning route for the additional vehicle comprising a first individual section, a platooning section and a second individual section is determined, by the platooning server. The platooning route of the additional vehicle may also comprise most sections, potentially several platooning and intermediate individual sections, depending on the platooning plan. Preferably, when an additional platooning request is received after at least some vehicles have already begun their platooning trip, the platooning plan is updated in a way that the platooning routes of the vehicles which are part of the original platooning plan do not change, or only change with respect to when a platoon is formed or with respect to the vehicle ordering within the platoon. Thus the original platooning plan preferably takes priority over the additional platooning request. It is also possible that more significant changes (in particular changes which effect the time of arrival of at least one vehicle) to the original platooning plan are possible, but only if all operators of vehicles of the original platooning plan agree to said changes.

Afterwards, an updated estimated resource gain distribution for the vehicles associated with the platooning requests and for the additional vehicle is determined by the platooning server. Then an updated estimated compensation associated with each vehicle associated with the platooning plan and the additional vehicle is determined, by the platooning server and/or the user devices, based on the updated estimated resource gain distribution and, optionally, additional vehicle data. Afterwards the platooning plan is updated by the platooning server to further comprise the additional platooning route of the additional vehicle. In this way, it is possible to integrate another vehicle into a platooning plan even after the platooning trips associated with the original platooning plan have already started.

As also mentioned above, it is preferably possible that the determining of the platooning plan and/or of the at least one estimated gain distribution is carried out by the platooning server based on previously collected data comprising measurements regarding the resource savings which were incurred or obtained during platooning trips. Said data may be stored in a memory, such as a hard-disk memory or a local or remote database associated with the platooning server. The measurements may, preferably, be sensor based measurements or measurements of the fuel or energy consumption of platooning vehicles in comparison to individually travelling vehicles along the same route. The data may comprise measurements relating to different types of fuel, such as gasoline, diesel, electric energy etc. The data may also comprise measurements relating to different vehicle classes, vehicle brands and different engines and/or to data collected by an on-board diagnostic system of the respective vehicles.

When additional measurements are received with respect to resources used or saved during platooning from sensor data of platooning vehicles, the memory associated with the platooning server may be updated, so that the method step of determining the estimated resource gain and/or the associated cost may be self-learning.

This disclosure is furthermore also directed at a method of a platooning server for distributing cost of platooning trucks and also to a complementary method of a user device for distributing cost of platooning trucks, wherein the respective method of the platooning server and the method of an individual user device each comprise the respective method steps described above which are performed by the respective device.

Besides the method described above, the present application is also directed at a system for distributing the cost of platooning trucks or vehicles, wherein the system comprises a platooning server and at least two user devices, wherein each of the user devices is associated with a vehicle.

The platooning server of the system comprises a server processing unit, a server receiving unit and a server sending unit.

The server processing unit is configured to determine a platooning plan comprising, for each vehicle, a first individual section, a platooning section and a second individual section, wherein the server processing unit is configured to select the platooning plan to improve a combined estimated resource consumption. The server processing unit is further configured to determine at least one estimated resource gain distribution for the vehicles associated with the platooning plan.

The server receiving unit is configured to receive at least two platooning requests from distinct user devices, each of which is associated with a distinct vehicle, wherein each platooning request comprises a start location and an end location.

The server receiving unit is further configured to receive, from at least one of the user devices, sensor data of the vehicle associated with said user device, wherein said sensor data is collected by the respective sensor during a platooning trip in accordance with the platooning plan and comprises sensor data, such as the sensor data discussed above with respect to the method.

The server sending unit is configured to send the determined platooning plan to the user devices and to send the estimated resource gain distribution to the user devices.

The server sending unit is also configured to send the estimated compensation associated with each vehicle and the updated estimated compensation associated with each vehicle to the respective vehicle.

Each user device is associated with a vehicle and comprises a user device processing unit, a user device receiving unit and a user device sending unit.

The user device sending unit is configured to send a platooning request associated with the user device and the vehicle to the platooning server, wherein the platooning request comprises a start location and an end location.

The user device sending unit is further configured to send sensor data of the vehicle, wherein said sensor data is collected during the platooning trip of the vehicle in accordance with the platooning plan.

The user device receiving unit is configured to receive, from the platooning server, the platooning plan and at least one estimated gain distribution of the vehicles associated with the platooning plan.

Furthermore, according to the disclosed system, the server processing unit and/or at least one of the user device processing units are further configured to determine an updated estimated compensation associated with the at least one vehicle based on the estimated compensation associated with the respective vehicle and the received sensor data.

Optionally the processing unit of each of the user devices may further be configured to determine an individual positioning preference as well an individual compensation threshold, based on the at least one estimated resource gain distribution and on additional vehicle specific data, and to send the individual positioning preference as well as the individual compensation threshold to the platooning server. Furthermore the processing unit of the platooning server may further be configured to determine, based on the individual positioning preference as well as the individual compensation threshold received from each of the user devices, a vehicle ordering as well as an estimated compensation associated with each vehicle.

The system described above may be embodied as a chip or chip set or using one or more interacting software components.

The user device sending unit and the user device receiving unit can be combined into a sending/receiving unit or communication interface of the user device. Similarly, the sending unit of the platooning server and the receiving unit of the platooning server may be combined into a sending/receiving unit or communication interface of the platooning server. Said communication interface may, for example, comprise an antenna and respective hardware as well as software for wireless communication. Furthermore, the sending/receiving unit may comprise means for interacting with said antenna in order to transmit a signal via said antenna. Alternatively, the sending/receiving unit may also support a wired communication, for example using a communication modem.

Each communication interface may be capable of communicating in accordance with various communication protocols, such as past or present protocols (1G, 2G, 2.5G, 3G, 4G, 5G) or future protocols serving a similar purpose. Furthermore, the communication interface may be able to communicate using UMTS, LTE, E-UTRAN technology or the like.

To increase the safety and reliability of the communication between the user devices and/or platooning server, redundant communication protocols may be used. For example, two vehicles may be in direct communication with each other directly using a secure near-field protocol as well as using WLAN or GNSS and/or also using a mobile phone connection. When the one connection is compromised, the vehicles which are currently joined into a platoon, can still communicate using another connection. If all communication channels are compromised, the platoon needs to be (temporarily) dissolved until a stable communication connection has been re-established.

While the reliability of the communication between a user device and the platooning server may be less critical than the reliability of the communication between the user devices, as platooning does not require a constant connection between the user devices (or respective vehicles) and the platooning server. However, reliability of the communication between the platooning vehicles or their respective user devices may be of utmost importance in order for the vehicle to safely form a platoon.

The optional and/or preferable features described with respect to the method above can, furthermore, also be implemented with respect to the system or vice versa.

This disclosure is furthermore also directed at a platooning server configured for distributing cost of platooning trucks and also at a user device configured for distributing cost of platooning trucks, wherein the platooning server and the individual user device each comprise the respective components described above which are described with respect to the respective device.

This application furthermore discloses a computer program product comprising instructions which, when executed on one or more computers cause the one or more computers to jointly carry out the method described above.

In particular, the one or more computers used for jointly executing the instructions comprised by the computer program product may comprise a platooning server and two or more user devices. The limitations discussed within this application with respect to the method for distributing the cost of platooning trucks or vehicles may, additionally also apply to the computer program product. The computer program product may furthermore comprise at least one non-transitory computer-readable storage medium, preferably one computer-readable storage medium for the platooning server and one additional computer-readable storage medium for each of the user devices.

Figure 2:
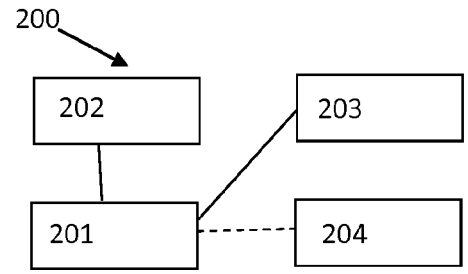
Figure 3:
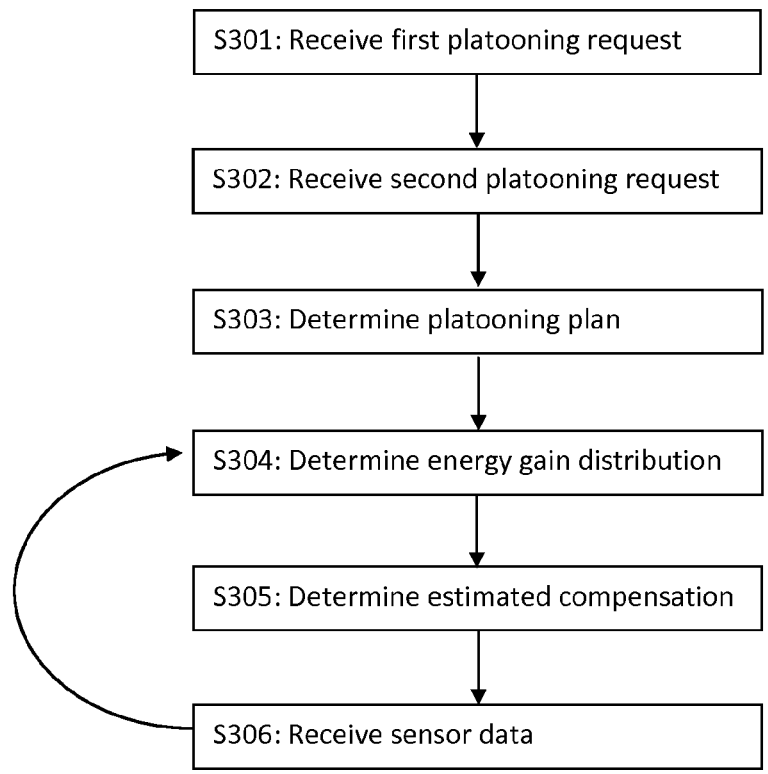
Figure 4:
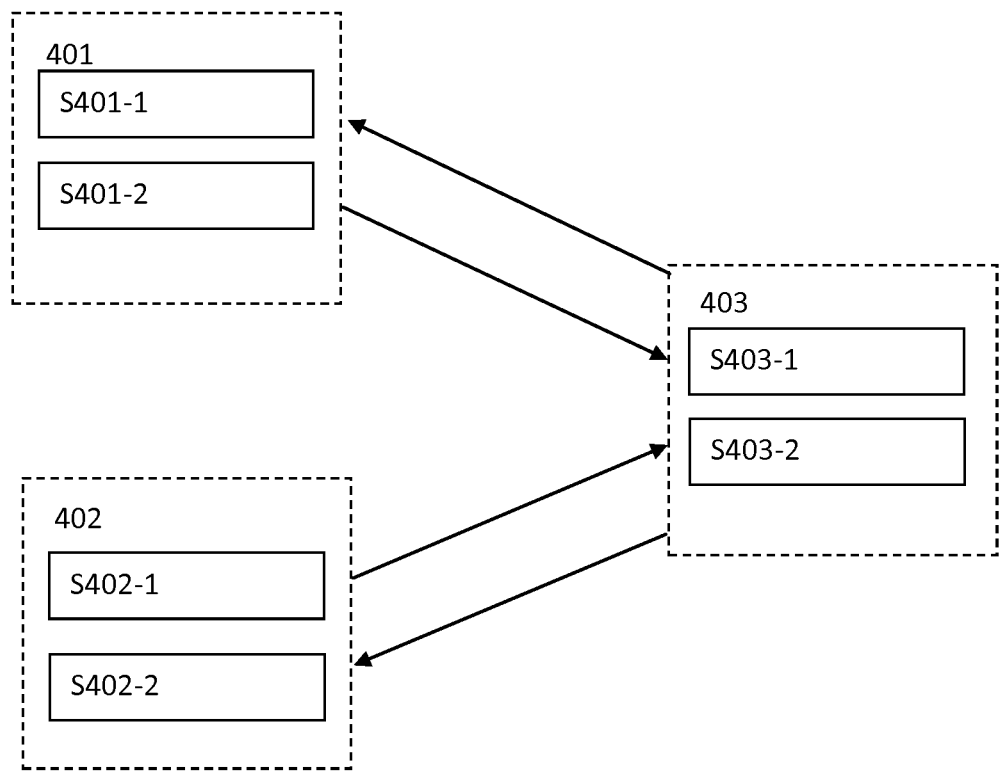

In the following, preferred embodiments and examples of the method, system and computer program product discussed above are described with reference to the following figures:

FIG. 1 schematically shows components of a user device for distributing cost and/or resource consumption of an associated platooning vehicle, FIG. 2 schematically shows components of a platooning server for distributing cost and/or resource consumption of platooning vehicle, FIG. 3 shows the control flow of the method steps of a method for distributing cost and/or resource consumption among platooning vehicles, FIG. 4 shows, in detail, the method step S305 of determining estimated resource gain distribution and estimated compensation from FIG. 3.

Figure 5:
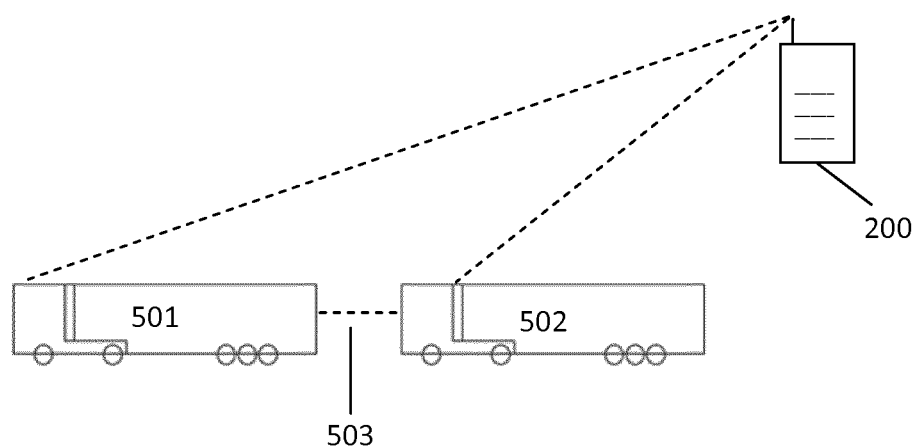
Figure 6:
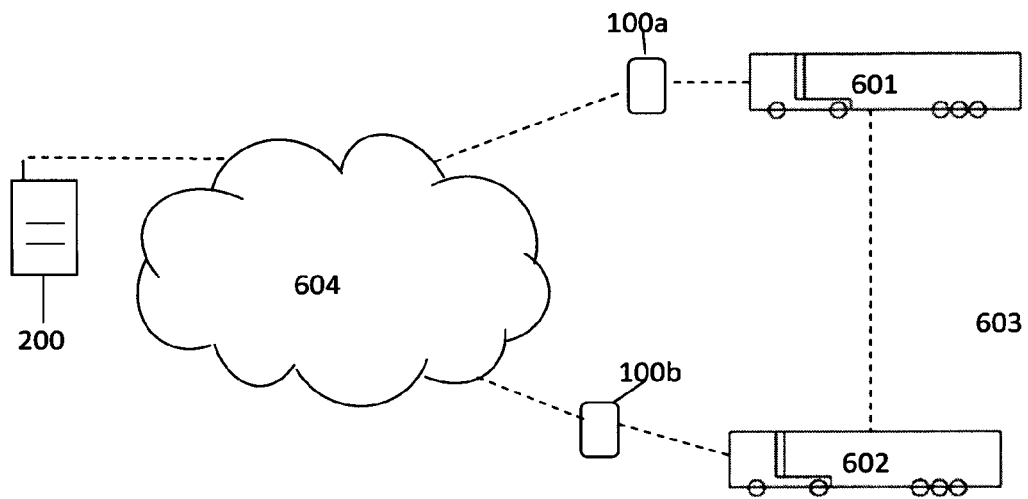
Figure 7:
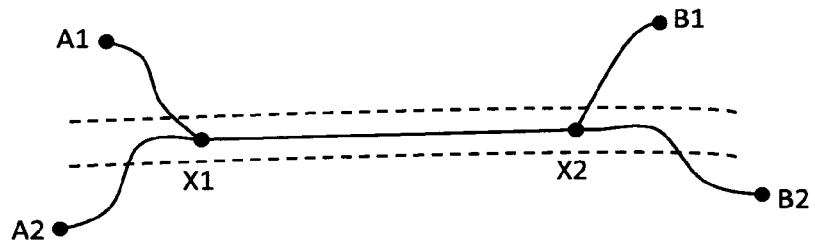
Figure 8:
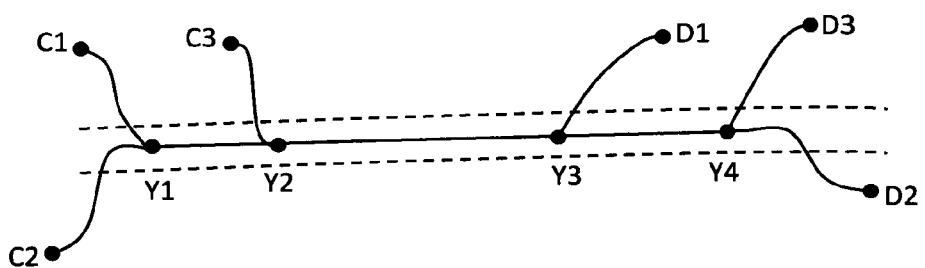

FIG. 5 schematically shows the interactions with two platooning vehicles and the platooning server, FIG. 6 shows the communication between two user devices associated with platooning vehicles and the platooning server through a network, FIG. 7 shows an example of a platooning plan comprising two vehicles, and FIG. 8 shows an example of a platooning plan comprising three vehicles.

According to this disclosure, a platooning plan and a distribution of the estimated cost is determined by a platooning server 200, as shown in FIG. 2, in interaction with user devices 100, as shown in FIG. 1, associated with respective vehicles.

Each of the user devices 100 comprises a processor 101, which is configured to execute computerized instructions stored in an associated memory 102. The memory 102 may, besides the instructions for execution by the processor 101, also comprise data which is, e.g., received, generated or measured by the processor 101. The processor 101 is furthermore connected (either by a wired or wireless connection) to a user interface 104 and a sending/receiving unit 103. The user interface 104 may comprise a display, such as a touch screen display and/or buttons or a keyboard through which a user may interact with and provide instructions to the processor. The sending/receiving unit 103 is preferably a wireless sending/receiving unit comprising, for example, an antenna, and the sending/receiving unit is configured for communicating data to and from the user device, wherein said data communicated to the user device may, for example, be received from the platooning server or from another user device. Data communicated from the user device may, for example, be sent to the platooning server or another user device. The user device may furthermore comprise or be connected to sensors 105-1, 105-2 which are part of or associated with the vehicle to which the user device is also associated.

The sensors may be visual or optical sensors, such as a camera or infrared or radar/LiDAR based sensors for observing the surroundings of the vehicle. Said imaging data is used for object detection and classification using a self-learning system. Furthermore, visual sensors can also be used for distance detection between the vehicles in a platoon or between the current vehicle and a peripheral object such as a car, tree, person, animal etc.

Furthermore, each vehicle comprises velocity sensors, temperature sensors, humidity sensors and/or rain sensors. The vehicles also comprise sensors and respective systems for GPS navigation and/or interactive geo-referencing in combination with sensors for position detection and/or navigation.

Vehicles can furthermore comprise, e.g., pressure sensors for determining energy usage with respect to fuel consumption or intelligent battery sensors. Also, the vehicles can comprise sensors which describe the movement of the vehicle, such as sensors for detecting the steering angle, rotary speed, velocity, pressure, temperature, emission, trajectory and/or fuel consumption. Vehicles furthermore comprise sensors for determining emission and sensors for determining the weight of the vehicle.

Some of the vehicles sensors, such as the speed sensor, sensors reporting driven distances, driver time and break time of drivers are sensors with high reliability, i.e. the probability of said sensors providing reliable data is near 100%. For some sensors, the very high reliability is a legal requirement, which must be fulfilled in order for the respective vehicle to be allowed on the road. Such high-reliability sensors can, for example be gauged or calibrated with high precision, or might even be certified as high-reliability by a respective authority.

Other sensors are regarded as medium or lower reliability sensors. Such sensors may not carry the same legal implications as the high reliability sensors and provide data relating to tire pressure, imaging of the surroundings of a vehicle, etc.Sensors with lower probability for providing reliable data for example may be used for determining emission, such as particle sensors and Mid-Infrared gas sensors, which determine data to provide energy and gas emission equivalents.

The platooning server 200 also comprises a processor 201 and an associated memory 202, in which instructions for execution by the processor may be stored. The platooning server furthermore comprises a sending/receiving unit 203 and may also comprise or be associated with a user interface 204. Said user interface 204 may be a remote user interface, so that the platooning server may, effectively, be running as a headless device, which can be controlled remotely by connecting another user interface or another device comprising a user interface to the platooning server.

Generally, at least two vehicles are involved in a platoon, as each platoon comprises at least two vehicles. Consequently, there are usually at least two user devices, which interact with the platooning server and, optionally, also among each other, in order to determine a platooning plan and associated resource and cost distribution.

The method which is carried out by said at least two user devices and the platooning server and also the functionality of the components of the user devices of platooning server is further described with respect to FIG. 3.

In step S301, a first platooning request is received by the sending/receiving unit of the platooning server from a sending/receiving unit of a first user device associated with a first vehicle. Furthermore, in step S302, a second platooning request is received by the sending/receiving unit of the platooning server from a sending/receiving unit of a second user device associated with a second vehicle. Each platooning request comprises a start location, end location (destination), start time and/or preferred end time, size and/or class of the vehicle. Method steps S301 and S302 may happen in any order or may also be carried out simultaneously.

In addition to the platooning requests of associated with the at least two vehicles, the platooning server may additionally receive preliminary individual resource consumption data associated with each of the vehicles. Said preliminary individual resource consumption data comprises preliminary individual sensor data related to the resource consumption and was preferably collected recently or under similar conditions, e.g. similar freight weight and/or weather. The preliminary individual resource consumption data is preferably normalized and relates to units of resources (such as fuel, power, emissions certificates etc.) while driving at a pre-determined speed along a straight road with little or no incline. Said preliminary individual resource consumption data can then be used to individually determine the estimated saving of each individual vehicle in the platoon as well as the combined estimated resource (and cost) saving associated with all the vehicles in the platoon combined.

After the platooning server has received at least two and possibly even three, or more platooning requests by way of the sending/receiving unit, the processor of the platooning server is configured to determine a platooning plan in accordance with the received platooning requests. Each platooning request includes an individual start location and end location of the current trip of the vehicle associated with the respective user device. And the platooning plan is determined by the platooning server in such a way that the overall cost is reduced, by grouping the vehicles together for long stretches, but without the vehicles taking unnecessary or excessive detours. In order to determine a cost and/or resource efficient platooning plan, the platooning server uses previously collected data which is stored in the associated memory. Said data may comprise parameters which reflect the cost or resource or energy consumption associated with a vehicle or truck travelling at a certain speed, possibly based on brand, age and/or weight of the vehicle. Furthermore, an average cost or energy consumption associated with speeding up in order to form a platoon as well as a cost associated with waiting for another vehicle by slowing down or stopping the vehicle for a given time might be included in the stored data. Using this data, the platooning server may estimate the average cost and suggest a platooning plan including a platooning route for each vehicle. The determining of the platooning plan may furthermore need to satisfy additional constraints regarding the road network, thereby taking into account where and under which conditions platooning is permitted.

In Step S304, the platooning server then determines a resource gain distribution based on the estimated cost associated with each vehicle which participates in the platooning plan. The resource gain distribution reflects a relative or absolute resource saving associated with each vehicle, thereby estimating how much energy or resource is saved by each vehicle when comparing the resources which are estimated to be used when the vehicle is travelling alone, in comparison to the resources which are estimated to be necessary, for said vehicle, when the vehicle is participating in the platooning plan. The resources which are estimated to be necessary when the vehicle is participating in the platooning plan are determined, e.g., based on the preliminary individual resource consumption data and a weighing factor, which allows scaling of the used resources based on the position of the vehicle in the platoon. Further parameters which influence the weighing factor, such as size or weight of the vehicle as well as distance between the platooning vehicles (which may be influenced by weather conditions) are taken into account. A combined estimated resource consumption may then be determined by summing the individual, weighted preliminary individual resource consumption values of the vehicles participating in the platoon.

In general, the vehicle travelling in front of the platoon as lead vehicle uses more resources than each of the vehicles following in the platoon. In platoons consisting of three or more vehicles, the last vehicle of the platoon also uses more resources than the vehicle in front of it, but less than the vehicle leading the platoon.

The difference in resources between the sum of the estimated resources used (and their associated cost) by the individual vehicles when travelling alone and the sum of the cost of the estimated resources used by the vehicles when travelling together, can then be regarded as the combined resource gain of the platoon. Said resource gain is then divided, in the form of a resource gain distribution, among the participating vehicles, so that each participating vehicle may profit from the platooning.

Based on the estimated resource gain distribution, the platooning server and the individual user devices may determine an estimated compensation which is either received by or payable by the operators of the individual user devices and/or vehicles, when said vehicles are participating in the platooning. The determining of the compensation is described in more detail below with reference to FIG. 4. The compensation may be delivered in terms of money or in terms of resources, resource certificates, emission certificates or the like.

After the estimated compensation of each vehicle has been determined, the operators of each vehicle may start executing the platooning plan in accordance with their respective user devices by travelling to the respective joining destination (where the platoon is intended to be formed in accordance with the platooning plan) and forming a platoon. Once the vehicles connect to form a platoon, at least part of the compensation becomes payable, even though adjustments are later possible, if the platooning plan is, for example only partially executed or based on received sensor data as described in the following.

During the platooning, in particular, while the vehicles are connected into a platoon, via their on-board systems, each vehicle collects sensor data of the vehicle's on-board sensors, such as distance sensors, velocity sensors, temperature sensors, humidity sensors, fuel sensors for indicating current fuel or battery levels, sensors which indicate a present resource consumption etc. The collected sensor data is then, at least partially, send to the platooning server, and the platooning server is configured to compare the collected sensor data with the parameters which were used while determining the estimated resource gain distribution and estimated compensation. If the sensor data received from at least one of the participating vehicles differs from the parameters used during the determining of the estimated compensation, it might be necessary to re-determine the resource gain distribution between the vehicles.

In order to determine whether or not the resource gain distribution needs to be re-calculated, sensor data collected by sensors of a different reliability level and/or sensor data associated with different vehicles is compared. This way, it can be determined whether sensor data indicating a higher (or lower) resource consumption of one vehicle is due to problems or changed conditions associated with only one vehicle or due to changed conditions affecting the entire platoon.

Re-determining the resource gain distribution for all vehicles can, for example become necessary if a platooning trip is taking longer than planned due to traffic or bad road conditions, or if inclement weather or traffic makes it necessary for the vehicles to keep a greater distance or travel more slowly than originally planned. If the resource gain distribution changes because of sensor data collected by the vehicles, then the compensation awarded to or paid by the individual operators might also need to change, so that the platooning is still profitable for all operators and the risk and cost associated with a change is plan is equally distributed among the operators of all vehicles.

Otherwise, if the sensor data indicating a higher-than-estimated resource consumption of one vehicle is due to problems with that vehicle, such as a low tire pressure, higher freight weight etc., then the resource gain distribution and associated compensation of the other vehicles should not change, but rather the individual vehicle would have to bear the cost of its own increased resource consumption (while still profiting from platooning).

Thus, when a higher than estimated resource consumption of one vehicle is indicated by sensor data received by the platooning server, the platooning server requests additional sensor data in order to validate and analyze the received sensor data.

If the received sensor data might indicate e.g. a malfunctioning sensor, for example because the difference between the estimated resource consumption and the resource consumption indicated by the received sensor value is above a first threshold, then the platooning server may request additional, preferably high reliability sensor data from the same vehicle.

If it is determined that the difference between the estimated and measured resource consumption is likely due to a malfunctioning sensor, then the data received from that sensor is subsequently disregarded and the respective owner of the vehicle is informed.

Alternatively, if a malfunctioning sensor is suspected, the platooning server may also request data from several additional sensors of the same vehicle and then decide which recorded data is accurate by way of a majority decision.

Otherwise, if a malfunctioning sensor is not suspected or ruled out by additional sensor data of the same vehicle, then additional sensor data is preferably requested from another vehicle of the platoon in order to determine if all vehicles of the platoon are using more or fewer resources than originally estimated, while preferably taking into account the different resource consumption, such as scaling of the resource consumption, according to the position of each individual vehicle within the platoon. Preferably the sensor data requested from the other vehicle is data obtained from a high-reliability sensor, but lower reliability sensor data may also be considered. Again, in case of conflicting sensor data received from several different sensors (within one vehicle or across vehicles), the data received from a high-reliability or at least higher reliability sensor is considered correct over a lower reliability sensor. If sensor data is received from more than two sensors, a majority decision is alternatively also possible.

If the sensor data of the other vehicle also indicates a changed resource consumption then the resource gain distribution is re-calculated, possibly adapting the resource consumption and resource gain resulting from platooning for all vehicles in the platoon.

The adapted resource gain and estimated compensation is then communicated to the user devices and/or owners associated with the respective vehicles. Upon receiving such an estimated resource gain and compensation, the individual owners may decide whether or not they still want to participate in the platoon.

FIG. 4 furthermore provides a detailed schematic view of the interactions between the first user device 401, the second user device 402 and the platooning server 403 in order to determine or update an estimated compensation associated with each vehicle.

After the platooning server has determined a resource gain distribution in step S304, the platooning server communicates said resource gain distribution to the user devices of the participating vehicles. In particular, the platooning server may send the entire resource gain distribution, i.e. the energy or resource gain (or loss) and/or the associated cost of each individual vehicle is communicated to all participating vehicles. Alternatively, it is also possible that only the specific resource gain of each individual vehicle is communicated to said vehicle.

The first user device 401 as well as the second user device 402 receives said resource gain distribution and determines, using its processor, an individual cost and/or resource saving associated with the received resource gain distribution, wherein the individual cost and/or resource saving is determined based on the current platooning route as well as on data stored in the memory of the first user device, wherein said data may refer to previously determined or observed cost and/or resource saving during a platooning trip. Also the processor of the first user device may be configured to take current sensor data of the respective first vehicle into account, such as the current freight and associated weight, or data regarding the engine of the respective vehicle. For example, in an older vehicle with a less efficient engine, the saved absolute cost associated with an estimated, relative resource saving may be greater than in a newer vehicle with a more efficient engine. Also the type of fuel used and the current fuel prices as well as the cost associated with the labor of the driver of the vehicle may be taken into account.

Based on the determined cost and/or resource saving, the processor of the first (and also, respectively of the second) user device, may then determine in step S401-1 or, respectively, step S402-1, a compensation threshold, indicating either the minimum of compensation expected from other vehicles, or the maximum of compensation offered to other vehicles or operators in order to participate in the platooning plan. The compensation threshold may either be automatically determined based on parameters set by the operator or based on parameters learned from previously collected data, or the compensation threshold may be set or further adjusted by the driver or operator of the vehicle. By allowing the individual user device and/or operator to determine the compensation threshold individually, it is possible for the operator to safeguard and keep private some of the data associated with the vehicle. Each user device 401, 402, or rather the processor of the respective user device, may furthermore also be configured to determine a positioning preference in step S401-2 or S402-2, indicating whether the vehicle of the user device would prefer to lead or follow in a platoon.

Each user device may also determine several compensation thresholds associated with different positions taken within the platoon. For example, a user device may determine that, if the respective vehicle is leading the platoon, then said vehicle (or associated operator) would expect payment of at least amount X, while, if the vehicle is following in the platoon, then the operator of this vehicle would be willing to offer at most amount Y.

The individually determined compensation thresholds and positioning preferences are then sent to the platooning server 403, which is configured to determine, in step S403-1, an estimated compensation for all vehicles, if such a compensation for all vehicles is possible based on the constraints imposed by the individual compensation thresholds received from the vehicles. The platooning server is furthermore also configured to determine, in step S403-2, a vehicle ordering, if such an ordering can be determined to satisfy all the positioning preferences of the individual user devices.

If it is not possible to determine an estimated compensation for each vehicle and/or a vehicle ordering which satisfies the individual compensation thresholds and positioning preferences off all vehicles or operators, then the platooning server may be configured to still determine an estimated compensation and position for each vehicle which does not satisfy all constraints imposed by the user devices, but which preferably comes close to satisfying all or at least many constraints. The compensation amounts determined by the platooning server may then again be sent to the user devices, which may, adjust their compensation threshold accordingly (either automatically by using a brokering program or manually by the driver or operator). Afterwards, the updated compensation threshold is send to the platooning server, which is configured to, again, attempt to determine an estimated compensation for each vehicle which satisfies the updated constraints of the updated compensation thresholds.

FIGS. 5 and 6 schematically show examples for vehicle-to-vehicle and vehicle-to-server communication during a platooning trip.

FIG. 5 shows two vehicles 501 and 502 which are travelling in a platoon. The vehicles are connected via a communication link 503, which enables the vehicles to use respective driver assistance or automatic driving systems, such as braking assistance etc. which allows the two vehicles to travel closely behind each other. Each of the vehicles is furthermore communicatively connected to the platooning server 200, which is configured to determine the platooning plan and communicate with the vehicles regarding the determination of the resource and/or cost distribution. The platooning server may also facilitate payment between the vehicles or respective operators which participate in the platoon.

FIG. 6 shows another schematic example of how the communication between the user devices, vehicles and platooning server may be organized. The platooning server 200 and the user devices 100a and 100b are each connected to a network 604. Each of the user devices 100a and 100b is furthermore communicatively connected to a respective vehicle 601 or 602, wherein the connection between the user device and the respective vehicle is preferably a short distance connection such as a Bluetooth connection or even a wired connection. The vehicles which are driving together in a platoon may furthermore also be communicatively connected directly to each other via a direct communication link 603 in order to exchange important messages, such as acceleration or braking instructions, without any network delay.

FIG. 7 illustrates a platooning plan and platooning routes for two vehicles, referred to as vehicle V1 and vehicle V2 in the following. Vehicle V1 is intended to travel from location A1 to location B1, while vehicle V2 is intended to travel from location A2 to location B2. The user devices associated with the vehicles V1 and V2 send messages to the platooning server (not pictured in FIG. 7) including the respective start and end locations and a preferred start time. The platooning server then determines, a platooning route, which is optimal for the current start and end locations of the two vehicles V1 and V2. In particular, the platooning server determines start times for both vehicles and a join location X1, and preferably also a join time, thereby determining when and where the two vehicles should meet to form a platoon. Furthermore, the platooning server determines a disjoin location, where the platoon is to be dissolved. The platooning server furthermore determines how much energy is being saved by each vehicle when the vehicles are travelling in a platoon led by vehicle V1 (with vehicle V2 following) and also how much energy is saved (relatively) by each vehicle when the vehicles are travelling in a platoon led by vehicle V2 (with vehicle V1 following).

The platooning server then communicates, i.e. sends, the relative energy savings associated with both vehicles orderings to the user devices of the respective vehicles V1 and V2. Each of the user devices then uses the received information in order to determine, privately, a cost and/or resource saving associated with the platooning, taking into account further data regarding the respective vehicle, such as estimated fuel consumption, current freight or weight of the vehicle, and cost associated with the driver, which might be lower if the driver is following rather than leading in the platoon. The user device may furthermore estimate the cost and/or resource saving of the other vehicle based, e.g., on publicly known attributes or data of said other vehicle, and then determine a compensation threshold, which the operator of the vehicle is either willing to pay or wishes to receive when participating in the platoon. Generally, the vehicle leading the platoon, which has the lowest actual cost and/or resource saving associated with the vehicle alone, would receive compensation from the following vehicle. After each user device has determined a compensation threshold, said threshold together with a respective positioning preference is send to the platooning sever, which determines an estimated compensation for each vehicle based on the available data.

Afterwards, the platooning server sends the estimated compensation together with the final platooning plan to the user devices of the vehicles V1 and V2 and, in return, receives a message of acceptance from each of the user devices, wherein said message indicates that the respective vehicle and its operator is planning to participate in the platoon. However, the payment of compensation is preferably only triggered after the vehicles have actually connected their on-board systems into a platoon.

Vehicle V1 then starts from location A1 and vehicle V2 starts from location A2. Both vehicles enter a highway or other road where platooning is permitted (indicated by the dashed lines in FIG. 7 and also in FIG. 8). At location X1, the two vehicles meet and form a platoon by connecting their on-board systems to make the short distance required for platooning possible. The vehicles V1 and V2 then travel together until location X2 where, according to the platooning plan, the platoon is dissolved and the vehicles continue separately to their respective destinations B1 and B2.

While the vehicles are travelling together, each vehicle continues to collect sensor data associated with the vehicles speed, road conditions, actual fuel or energy consumption, weather conditions and the distance between the two vehicles. This data is then at least partially transmitted to the platooning server, which analyses the respective sensor data to determine whether the estimated compensation needs to be updated, while taking data from other, preferably high reliability, sensors either from the same or other vehicles or external sensor data into account. If the resource gain distribution and/or the compensation is updated, the updated resource gain distribution and/or compensation for the different vehicles is communicated to the respective user devices of the vehicles participating in the platoon. It is possible that a maximum amount for compensation adjustment is already included in the platooning plan or send along with the estimated compensation determined by the platooning server, thereby limiting the adjustment of the compensation based on sensor data collected by the respective vehicles.

FIG. 8 furthermore shows a platooning scenario involving three vehicles V1, V2 and V3. The communication between the vehicles and between the platooning server and the vehicles is essentially the same as discussed above with respect to FIG. 7. However, in case of three or more vehicles, it is possible that there are several distinct platooning sections of a platooning plan, wherein each platooning section may have a distinct set of vehicles and or a vehicle ordering which differs from the previous vehicle ordering (different orderings throughout the platooning plan are even possible when there are only two vehicles involved).

In the scenario illustrated by FIG. 8, the vehicles V1 and V2 start from their respective start locations C1 and C2 and meet and form a platoon at location Y1. In this example, vehicle V1 is leading and vehicle V2 is following between locations Y1 and Y2. Vehicle V3 starts at start location C3 and meets the platoon consisting of vehicles V1 and V2 at location Y2. The three vehicles now form a platoon with vehicle V3 leading and vehicles V1 and V2 following until location Y3, where vehicle V1 leaves the platoon and vehicles V3 and V3 continue at a two-vehicle platoon until location Y4, where the platoon is dissolved and vehicles V2 and V3 continue separately to their final destinations D2 and D3.

In the scenario of FIG. 8 it is also possible that the platooning request of vehicle V3 is received only after the platooning plan for vehicles V1 and V2 has already been determined by the platooning server and at least one of V1 and V2 has already started its respective platooning trip. In this case, the platooning server is configured to first determine whether it is possible to add vehicle V3 to the platooning plan without major changes to the platooning routes of vehicles V1 and V2. Afterwards, the platooning server is configured to update the platooning plan and estimated compensation for each vehicle by including vehicle V3 and by sending the respective updated resource gain distributions to the involved vehicles (or their respective user devices) V1, V2 and V3.

The invention claimed is:

1. A computer-implemented method for distributing cost of platooning trucks, comprising:
configuring a platooning server to process platooning requests and individual resource consumption in real-time from a plurality of autonomous vehicles equipped with one or more certified high-reliability sensors;
electronically receiving, by the platooning server, at least two platooning requests from at least two user devices associated with at least two vehicles, wherein each platooning request is received from a distinct user device of the at least two user devices associated with a distinct vehicle of the at least two vehicles and wherein each platooning request comprises a start location, and an end location;
electronically receiving, by the platooning server, preliminary individual resource consumption data associated with each of the at least two vehicles;
determining, by the platooning server, based on the at least two platooning requests, a platooning plan comprising, for each of the at least two vehicles, a platooning route comprising at least a first individual section, a platooning section and a second individual section, wherein the platooning plan is determined to reduce a combined estimated resource consumption;
determining, by the platooning server, based on the platooning plan, at least one estimated energy or emission cost distribution for the at least two vehicles associated with the platooning plan, while taking into account the preliminary individual resource consumption data for each of the at least two vehicles;
determining, by the platooning server and/or the user devices, an estimated cost associated with each of the at least two vehicles based at least in part on the estimated energy or emission cost distribution;
electronically receiving, by the platooning server from a first user device of the at least two user devices, sensor data of the first vehicle associated with said first user device, wherein said sensor data is collected by sensors of the first vehicle while said first vehicle is travelling along the respective platooning route in accordance with the platooning plan, wherein the received sensor data of the first vehicle is in conflict with the estimated combined resource consumption thereby indicating a changed resource consumption;
electronically receiving, by the platooning server and/or at least one of the at least two user devices, additional sensor data collected by one or more additional sensors, wherein the one or more additional sensors have a higher reliability level than the sensors of the first vehicle, wherein the one or more additional sensors from which the additional sensor data is received, are certified high-reliability sensors that are gauged or calibrated with a high-precision;
determining, by the platooning server and/or at least one of the at least two user devices, based on the additional sensor data, whether the conflicting sensor data of the first vehicle is due to a problem or a changed condition associated exclusively with the first vehicle or due to a changed condition affecting all of the at least two vehicles;
responsive to a determination by the platooning server and/or at least one of the at least two user devices that the conflicting sensor data of the first vehicle is due to a problem or a changed condition associated exclusively with the first vehicle, keeping the energy or emission cost distribution and cost of other vehicles of the at least two vehicles and sending a command to the first vehicle to control an autonomous operation of the first vehicle; and otherwise, calculating, by the platooning server and/or at least one of the at least two user devices, an updated energy or emission cost distribution and updated cost associated for each of the at least two vehicles based on the estimated energy or emission cost distribution, the estimated cost associated with the first vehicle, and the received sensor data of the first vehicle and the additional sensor data.

2. The method of claim 1, wherein, determining the estimated cost associated with each vehicle comprises:

determining, by each of the at least two user devices, an individual positioning preference as well an individual cost threshold, based on the at least one estimated energy or emission cost distribution and on additional vehicle specific data, and sending the individual positioning preference as well as the individual cost threshold to the platooning server; and determining, by the platooning server, based on the individual positioning preference as well as the individual cost threshold received from each of the user devices, a vehicle ordering as well as an estimated cost associated with each vehicle.

3. The method of claim 1, wherein the sensor data, which is collected by sensors of the first vehicle while the first vehicle is travelling along the respective platooning route, is collected continuously or at short intervals.

4. The method of claim 1, wherein each platooning request further comprises:

at least one of size or weight or other physical information regarding the distinct vehicle and/or a position preference of the distinct vehicle within the platoon, information regarding fuel or energy consumption for each of the at least two vehicles, or information regarding an emission of the distinct.

5. The method of claim 2, wherein the additional vehicle specific data comprises at least one of: information regarding a fuel or energy consumption of the distinct vehicle, information regarding freight of the distinct vehicle, information regarding working hours of a driver of the distinct vehicle, an individual cost associated with leading a platoon, or an individual cost associated with following in a platoon.

6. The method of claim 2, wherein after determining, based on the individual positioning preference as well as the individual cost threshold received from each of the user devices, a vehicle ordering as well as an estimated cost associated with each vehicle, the method further comprises:

receiving, by the platooning server, an additional platooning request from an additional user device associated with an additional vehicle, wherein the additional platooning request comprises a start location and an end location;

determining, by the platooning server, an additional platooning route for the additional vehicle comprising a first individual section, a platooning section and a second individual section;

determining, by the platooning server, an updated estimated energy or emission cost distribution for the vehicles associated with the platooning requests and for the additional vehicle, determining, by the platooning server and/or the user devices, an updated estimated cost associated with each vehicle associated with the platooning plan and the additional vehicle based at least in part on the updated estimated energy or emission cost distribution; and updating the platooning plan to further comprise the additional platooning route of the additional vehicle.

7. The method of claim 6, wherein the platooning plan and/or the at least one estimated energy or emission cost distribution is determined by the platooning server based on previously collected data comprising one or more measurements regarding an amount of resource savings incurred during one or more platooning trips which is stored in a memory associated with the platooning server, and wherein the platooning plan and/or the at least one estimated energy or emission cost distribution are determined using machine learning.

8. The method of claim 7, wherein the previously collected data stored in the memory associated with the platooning server is updated when additional measurements regarding the amount of resource savings incurred during the one or more platooning trips are obtained.

9. The method of claim 7, wherein the previously collected data collected during the one or more platooning trips comprises at least one of: velocity data, humidity data, fuel or energy consumption data, visual data regarding surroundings of the first vehicle, distance data between at least two of the vehicles associated with the platooning plan.

10. A system for distributing cost of platooning trucks comprising:

a platooning server and at least two user devices, wherein the platooning server is configured to process platooning requests and individual resource consumption in real-time from a plurality of autonomous vehicles equipped with one or more certified high-reliability sensors, and wherein the platooning server comprises:

a server processing unit configured to:

determine a platooning plan comprising, for each vehicle of at least two vehicles, a first individual section, a platooning section and a second individual section, wherein the server processing unit is configured to determine the platooning plan to reduce a combined estimated resource consumption; and determine at least one estimated energy or emission cost distribution for the at least two vehicles associated with the platooning plan, while taking into account preliminary individual resource consumption data for each of the at least two vehicles;

a server receiving unit configured to:

receive at least two platooning requests from distinct user devices of at least two user devices, each of which is associated with a distinct vehicle of the at least two vehicles, wherein each platooning request comprises a start location and an end location; and receive the preliminary individual resource consumption data associated with each of the at least two vehicles;

a server sending unit configured to:

send the determined platooning plan to each of the at least two user devices;

send the estimated energy or emission cost distribution to each of the at least two user devices; and send an estimated cost associated with each of the at least two vehicles and an updated estimated cost associated with each of the at least two vehicles to each of the at least two vehicles;

wherein each user device is associated with a vehicle and comprises a user device processing unit and wherein the system further comprises:

a user device sending unit configured to:
send a platooning request associated with the user device and the associated vehicle to the platooning server, wherein the platooning request comprises a start location and an end location; and
send sensor data of the associated vehicle, wherein said sensor data is collected during a platooning trip of the associated vehicle in accordance with the platooning plan; and
a user device receiving unit configured to:
receive, from the platooning server, the platooning plan and at least one estimated distribution of the at least two vehicles associated with the platooning plan;
wherein the server processing unit and/or at least one of the at least two user device processing units are further configured to determine, , based on additional sensor data collected by one or more additional sensors, whether conflicting sensor data of the first vehicle is due to a problem or a changed condition associated exclusively with the first vehicle or due to a changed condition affecting all of the at least two vehicles, wherein the one or more additional sensors have a higher reliability level than the sensors of the first vehicle, wherein the one or more additional sensors from which the additional sensor data is received, are certified high-reliability sensors that are gauged or calibrated with a high-precision; and
when it is determined, by the server processing unit, that the changed resource consumption of the first vehicle is due to a problem or a changed condition associated exclusively with the first vehicle, the server processing unit keeps the energy or emission cost distribution and cost of other vehicles of the at least two vehicles and sends a command to the first vehicle to control an autonomous operation of the first vehicle, otherwise, by the platooning server and/or at least one of the at least two user devices, an updated estimated cost for each of the at least two vehicles based on the estimated energy or emission cost distribution and/or the estimated cost associated with the first vehicle and the received sensor data of the first vehicle and the additional sensor data.

11. The system according to claim 10, wherein the processing unit of each of the user devices is further configured to determine an individual positioning preference as well an individual cost threshold, based on the at least one estimated energy or emission cost distribution and on additional vehicle specific data, and to send the individual positioning preference as well as the individual cost threshold to the platooning server, wherein the processing unit of the platooning server is further configured to determine based on the individual positioning preference as well as the individual cost threshold received from each of the user devices, a vehicle ordering as well as an estimated cost associated with each vehicle.

12. A non-transitory computer-readable medium comprising instructions which, when executed on one or more computers cause the one or more computers to:
configure a platooning server to process platooning requests and individual resource consumption in real-time from a plurality of autonomous vehicles equipped with one or more certified high-reliability sensors;
receive, by a platooning server, at least two platooning requests from at least two user devices associated with at least two vehicles, wherein each platooning request is received from a distinct user device of the at least two user devices associated with a distinct vehicle of the at least two vehicles and wherein each platooning request comprises a start location, and an end location;
receive, by the platooning server, preliminary individual resource consumption data associated with each of the at least two vehicles;
determine, by the platooning server, based on the at least two platooning requests, a platooning plan comprising, for each of the at least two vehicles, a platooning route comprising at least a first individual section, a platooning section and a second individual section, wherein the platooning plan is determined to reduce a combined estimated resource consumption,
determine, by the platooning server, based on the platooning plan, at least one estimated energy or emission cost distribution for the at least two vehicles associated with the platooning plan, while taking into account the preliminary individual resource consumption data for each of the at least two vehicles;
determine, by the platooning server and/or the user devices, an estimated cost associated with each of the at least two vehicles based at least in part on the estimated energy or emission cost distribution;
receive, by the platooning server from a first user device of the at least two user devices, sensor data of the first vehicle associated with said first user device, wherein said sensor data is collected by sensors of the first vehicle while the first vehicle is travelling along the respective platooning route in accordance with the platooning plan, wherein the received sensor data of the first vehicle is in conflict with the estimated combined resource consumption thereby indicating a changed resource consumption;
receive, by the platooning server and/or at least one of the at least two user devices, additional sensor data collected by one or more additional sensors, wherein the one or more additional sensors have a higher reliability level than the sensors of the first vehicle, wherein the one or more additional sensors from which the additional sensor data is received, are certified high-reliability sensors that are gauged or calibrated with a high-precision;
determine, by the platooning server and/or at least one of the at least two user devices, based on the additional sensor data, whether the conflicting sensor data of the first vehicle is due to a problem or a changed condition associated with the first vehicle or due to a changed condition affecting all of the at least two vehicles;
responsive to a determination by the platooning server and/or at least one of the at least two user devices that the conflicting sensor data of the first vehicle is due to a problem or a changed condition associated with the first vehicle, keep the energy or emission cost distribution and compensation of other vehicles of the at least two vehicles and send a command to the first vehicle to control an autonomous operation of the first vehicle; and
otherwise, calculate, by the platooning server and/or at least one of the at least two user devices, an updated energy or emission cost distribution and updated cost associated for each of the at least two vehicles based on the estimated energy or emission cost distribution, the estimated cost associated with the first vehicle, and the received sensor data of the first vehicle and the additional sensor data.

13. The non-transitory computer-readable medium of claim 12, wherein the one or more computers comprise the platooning server and the two or more user devices.

14. The method of claim 1, wherein the autonomous operation of the first vehicle includes at least one of: causing the first vehicle to change speed, causing the first change a position in the platoon, or causing the first vehicle to exit the platoon.

15. The system of claim 10, wherein the autonomous operation of the first vehicle includes at least one of: causing the first vehicle to change speed, causing the first change a position in the platoon, or causing the first vehicle to exit the platoon.

16. The non-transitory computer-readable medium of claim 12, wherein the autonomous operation of the first vehicle includes at least one of: causing the first vehicle to change speed, causing the first change a position in the platoon, or causing the first vehicle to exit the platoon.

* * * * *